US012460530B2

United States Patent
Stewart

(10) Patent No.: US 12,460,530 B2
(45) Date of Patent: Nov. 4, 2025

(54) DRILLING RATE OF PENETRATION

(71) Applicant: GLOBALTECH CORPORATION PTY LTD, Forrestfield (AU)

(72) Inventor: Gordon Stewart, Forrestfield (AU)

(73) Assignee: IMDEX TECHNOLOGIES PTY LTD, Balcatta (AU)

( * ) Notice: Subject to any disclaimer, the term of this patent is extended or adjusted under 35 U.S.C. 154(b) by 0 days.

(21) Appl. No.: 17/923,229

(22) PCT Filed: May 4, 2021

(86) PCT No.: PCT/AU2021/050410
§ 371 (c)(1),
(2) Date: Nov. 4, 2022

(87) PCT Pub. No.: WO2021/222977
PCT Pub. Date: Nov. 11, 2021

(65) Prior Publication Data
US 2023/0184085 A1    Jun. 15, 2023

(30) Foreign Application Priority Data
May 4, 2020 (AU) ............................... 2020901410

(51) Int. Cl.
| | |
|---|---|
| *E21B 45/00* | (2006.01) |
| *E21B 44/00* | (2006.01) |
| *G01C 5/06* | (2006.01) |
| *G01C 21/16* | (2006.01) |
| *G01C 25/00* | (2006.01) |

(52) U.S. Cl.
CPC .............. *E21B 45/00* (2013.01); *E21B 44/00* (2013.01); *G01C 21/165* (2013.01); *G01C 21/1652* (2020.08); *G01C 21/1656* (2020.08); *G01C 25/00* (2013.01); *G01C 5/06* (2013.01)

(58) Field of Classification Search
CPC .. E21B 45/00; G01C 21/1652; G01C 21/1656
See application file for complete search history.

(56) References Cited

U.S. PATENT DOCUMENTS

| | | |
|---|---|---|
| 516,635 A | 3/1894 | Scott |
| 643,083 A | 2/1900 | Bullock |

(Continued)

*Primary Examiner* — Blake Michener
(74) *Attorney, Agent, or Firm* — Stites & Harbison, PLLC; Terry L. Wright

(57) ABSTRACT

Rate of penetration (ROP) measurement system (10) has sensor apparatus on a drill rig detecting drilling advancement. Sender (38, 200) transmits to a receiver (40, 204), optionally via a reflector (39, 208). An electronic sub (201) can include the sender (200), receiver (204) or reflector (208). Reflector (39, 208) reflects signals to the receiver (40, 204). Distance measurement or space mapping can use LIDAR/laser and MEMS mirror. Releasable attachment to the drill rig can be by magnet (112). Atmospheric or barometric pressure can be detected and pressure change can be used to determine distance moved. WOB, RPM, torque and time rate of progress can be measured and combined with distance moved measurements to assess wear on a drill bit. Near real time
ROP measurement can be calculated and displayed (17) and/or reported (21). Drilling efficiency and premature drill wear or change in rock can be determined.

8 Claims, 10 Drawing Sheets

(56) References Cited

U.S. PATENT DOCUMENTS

| | | |
|---|---|---|
| 3,853,004 A | 12/1974 | Westlake |
| 4,932,248 A | 6/1990 | Delignieres |
| 2009/0090555 A1 | 4/2009 | Boone |
| 2010/0252325 A1 | 10/2010 | Porche |
| 2013/0317741 A1* | 11/2013 | Brashear ............ G01C 21/1654 |
| | | 701/472 |
| 2015/0275648 A1 | 10/2015 | Wang |

* cited by examiner

DRILLING RATE OF PENETRATION

FIELD OF THE INVENTION

The present invention relates to rate of penetration (ROP) during a drilling operation.

One or more forms of the present invention relates to monitoring, sensing and/or measuring rate of penetration, particularly during onshore hard rock drilling operations.

The present invention finds application as a method for monitoring, sensing and/or measuring a rate of penetration of a drilling assembly while drilling and/or apparatus or system for monitoring, sensing and/or measuring a rate of penetration according to the respective method.

BACKGROUND TO THE INVENTION

Typically, the depth of a drilling assembly in the borehole is determined by measuring the length of pipe entered into the borehole from the surface. The depth may be corrected for the effects of drill string tension or compression, such as due to the length of the drillstring and ambient temperature.

As such, the total length of the borehole can readily be determined from the total length of the number of known lengths of drill tubes (usually in 3 m or 6 m lengths) added to the backend of the drilling assembly incorporating the drill bit or other downhole tool. The vertical depth of the borehole can be determined from the length of the drillstring, inclination and azimuth of the borehole.

Such absolute depth and vertical depth of the borehole and the length of the drillstring are useful data. However, to measure productivity and progress of the borehole, and to predict when a preferred depth might be reached, the rate of penetration (ROP) of the drill bit into the underlying rock is a valuable measure.

Such ROP measurement for a drilling operation is typically calculated manually. For example, as a function of depth drilled over time. A simple calculation of the length of drillstring at the surface progressing downwards over time is used to determine the ROP.

One known system for measuring rate of drill penetration for a drilling operation is disclosed in US patent document U.S. Pat. No. 3,853,004, which describes use of a measuring system having rotary transducer to measure the distance a draw cable advances during a drilling operation. The transducer has a wheel which rests against the draw cable. As the drill advances, the draw cable also advances. This causes the rotary transducer wheel in contact with the cable to rotate and provide an angular measurement equating to distance. Rate of penetration can be calculated based on the measured time taken for the wheel to rotate a given number of degrees.

Measuring or monitoring drill bit wear in hard-rock rills (particularly diamond-tipped drill bits) is important so that drill operators know more accurately and reliably when the expensive and time consuming operation of removing the drillstring from the borehole and changing a (diamond-tipped) drill bit needs to be carried out.

Furthermore, comparing drill bit penetration rate to records/logs of previously drilled holes can confirm if a reduction in penetration is due to geological formation or the stratified nature of the borehole.

Also, knowing the ROP or change in ROP over time helps to determine whether to adjust weight-on-bit (WOB) to control drill bit wear and potentially prevent failure of the drill bit, until a suitable drill bit change-out time.

Whilst a general feel for rate of penetration is often obtained in a drilling operation by dividing the total length of the drill rods by the time taken during the day to drill that length, such a measure is an overall average ROP, does not give any detail of variance in ROP during the drilling operation shift(s) or due to different operators working the drill, or different rock strata.

It has been found desirable to improve determination of rate of penetration for a drilling assembly that alleviates or overcomes at least one of the aforementioned problems.

It has further been found desirable to be able to provide an objective assessment of drilling performance for one or more drilling operations.

It has further been found desirable to obtain real time rate of penetration data, which can be used to optimise drilling performance and reduce premature wear of drill bits.

It is with the aforementioned problems and desires in mind that the present invention has been developed.

It is to be understood that, if any prior art is referred to herein, such reference does not constitute an admission that the prior art forms a part of the common general knowledge in the art, in Australia or any other country.

SUMMARY OF THE INVENTION

An aspect of the present invention provides a drilling rate of penetration or distance moved measurement system for a drilling operation, the system including at least one sensor to provide an indication of rate and/or distance a drill bit or other tool advances into a borehole.

A further aspect of the present invention provides a method of optimising drilling performance of a drilling system, the method including determining rate of penetration of the drill during a drilling operation by obtaining from at least one sensor an indication of a distance advanced by the drill bit during a period of drilling.

Preferably the method includes calculating rate of penetration of the drill bit over the distance during a period of time, and controlling at least one drilling parameter based on at least the drilling rate of penetration.

Another aspect of the present invention provides a method of controlling drilling performance of a drilling system, the method including determining rate of penetration of the drill during drilling, and controlling at least one of: weight on bit (WOB), flow of drilling fluid, torque applied to the drill bit and revolutions per minute (RPM) of the drill bit.

The ROP value(s) may be used to influence control of at least one of weight on bit (WOB), flow of drilling fluid, torque applied to the drill bit and revolutions per minute (RPM) of the drill bit. Thus, a feedback can be provided such that measured or calculated ROP is used as a parameter/input in calculating a required WOB, torque, RPM or fluid flow circulated to/from the drill bit to modify or control drill bit wear or drill penetration rate.

Preferably the system, apparatus or method includes a timer or clock providing an indication of an elapsed time during which the drill bit or other tool advanced a distance.

A measure of rate of penetration of the drill bit or other tool into the borehole may preferably be calculated by dividing or differentiating the distance with respect to time to give a velocity (rate of penetration).

Preferably, the rate of penetration may be sensed, measured or monitored automatically, such as the sensor communicating with a central computer/processor.

Rate of penetration may be determined from sensing one or more of acceleration and/or position, either or both of downhole or in relation to movement a drill mast.

For example, one or more sensors may be provided in an instrument provided downhole. Alternatively, or in addition, one or more sensors may be provided at a drill mast at the surface.

A measurement system may be provided to determine distance moved as masthead moves, such as a top drive advancing downwards as a drill string and drill advance into the borehole.

It will be appreciated that one or more sensors may be provided to sense or detect the relative change in movement of the drill bit, drill string or component of the drill mast, or a combination of two or more thereof.

One or more embodiments of the present invention provides for determining/measuring rate of penetration whilst drilling.

For example, the one or more sensors may include at least one pressure sensor, such as at least one atmospheric pressure sensor or barometric pressure sensor arranged and configured to detect a change in environmental/surrounding air pressure.

The at least one air pressure sensor or barometric pressure sensor may include at least one such sensor arranged to move with advancing or withdrawing movement of a drill, drill rod, downhole instrument or other downhole tool or tube/pipe.

Preferably at least one reference is provided relative to the moving at least one atmospheric pressure sensor or barometric pressure sensor. The reference may be a fixed reference.

For example, a first atmospheric pressure sensor or barometric pressure sensor may be arranged to move up and/or down during respective movement of a drill/drill string or other downhole tool, and a second atmospheric pressure sensor or barometric pressure sensor may provide the reference. The reference may provide a reference atmospheric pressure or barometric pressure relative to any detected change in atmospheric pressure or barometric pressure detected by the at least one atmospheric pressure sensor or barometric pressure sensor.

The first or moving atmospheric pressure sensor or barometric pressure sensor and the second or reference atmospheric pressure sensor or barometric pressure sensor may releasably mount to a drill, such as a drilling mast.

Releasable mounting may be by magnetic attachment through at least one magnet provided on the respective first and/or second atmospheric pressure sensor or barometric pressure sensor. Alternative attachment may be provided, such as tie straps, adhesive, mechanical fasteners(s) (e.g. screws, bolts)

The first and second atmospheric pressure sensor or barometric pressure sensor may each include a memory for storing pressure values and/or altitude values. Alternatively, one of the atmospheric pressure sensor or barometric pressure sensor may transmit detected values to the other.

For example, the first atmospheric pressure sensor or barometric pressure sensor may transmit any change in pressure/altitude or absolute values thereof to the second atmospheric pressure sensor or barometric pressure sensor The first atmospheric pressure sensor or barometric pressure sensor may detect a change in atmospheric/barometric pressure as a change in altitude/height. When that change in pressure is known relative to a reference, such as an initial pressure measurement at a known altitude/height or to a reference pressure (such as measured by the second atmospheric pressure sensor or barometric pressure sensor), the change in height position of the first atmospheric pressure sensor or barometric pressure sensor can be determined.

Preferably, the second atmospheric pressure sensor or barometric pressure sensor provides a fixed point reference pressure so that if atmospheric/barometric pressure varies during the day, such with a change of weather or temperature, the first atmospheric pressure sensor or barometric pressure sensor will measure atmospheric/barometric pressure relative to that reference. That is, if the first atmospheric pressure sensor or barometric pressure sensor is at the same height as the second atmospheric pressure sensor or barometric pressure sensor (such as with the top drive fully advanced downwards), the pressure reading of both the first and second atmospheric pressure sensors or barometric pressure sensors will be the same.

As the first atmospheric pressure sensor or barometric pressure sensor differs in height from the reference, such as moving away form or towards the second atmospheric pressure sensor or barometric pressure sensor) the change in height/altitude relative to the reference can be detected.

Preferably apparatus or device including the first atmospheric pressure sensor or barometric pressure sensor and apparatus or device including the second atmospheric pressure sensor or barometric pressure sensor may be identical.

Atmospheric air density can vary with air temperature. The atmospheric air on a 43° C. day is less dense than the atmospheric air on a cold day at the same base level. Starting altitude can affect this as air density also varies with altitude above sea level. However, with a second atmospheric pressure sensor or barometric pressure sensor apparatus/device to provide a fixed reference and a moving (first) atmospheric pressure sensor or barometric pressure sensor to provide the moving measurement, temperature and base altitude are compensated for.

Preferably two or more sensor apparatus or devices may be provided which synchronise with one another. For example, two or more sensor apparatus or devices may communicate a reference (calibration) from one to the other, or may confirm each is measuring the same present value, such as both being at the same temperature and/or atmospheric pressure.

Alternatively or in addition, one or more of the sensor apparatus or devcies may communicate sensed data, such as one or more of a value or change in value of sensed atmospheric/barometric air pressure, distance, acceleration/deceleration, altitude, speed, rate of change of acceleration or deceleration (aka 'jerk'), temperature and/or humidity.

Preferably, at least one said sensor apparatus or device may be enabled to calibrate itself to a value provided from another said sensor apparatus or device or from a reference apparatus or device.

The rate of penetration (ROP) measurement can be in real time or near real time since the one or more sensors provides respective measurement signals during drilling, and preferably on a continuous, near continuous or, if preferred, a periodic basis.

An instrument, apparatus or sensor may be provided at the masthead or downhole, or an instrument or sensor at both (such as to correlate values from both instruments to check accuracy) downhole instrument may include at least one accelerometer, preferably a multi-axis accelerometer (more preferably a three-axis accelerometer) or a number of accelerometers providing multi-axis acceleration detection.

An alternative or additional sensor may include at least one of: an accelerometer or multi-axis accelerometer, one or more electromagnetic wave sensors—such as one or more of a LIDAR sensor, MEMS mirror, radar sensor, ultrasonic sensor, optical sensor—such as a camera, magneto-resistive sensor, microwave sensor, infrared sensor, and/or at least one gyroscopic sensor.

Alternatively, or in addition, a three-axis gyro output may be provided from a multi axis gyroscopic detector, with such a detector provided downhole or at the mast head, or at least one at each of downhole and at the mast head.

A downhole instrument, apparatus or sensor may be provided in the drill string, such as behind the drill bit, or in or attached to a tube forming part of the drill string.

Measurements of progress and/or rate of progress of drilling may be time stamped and/or position/location stamped. For example GPS location, date and time may be recorded periodically or continuously against ROP and/or depth measurements.

Temperature compensation may be provided for calibration of the instrument, accelerometer(s) and/or gyroscopic sensor(s).

The instrument, accelerometer(s) and/or gyroscopic sensors may be powered by a battery, such as a rechargeable battery.

A user interface may be provided to monitor and/or manage such automatic control.

One or more embodiments of the present invention may include at least one threshold detector. For example, to warn operators when optimisation parameters have dropped below the preferred state to inform that a bit needs to be changed.

Thus, one or more embodiments of the present invention may preferably include monitoring one or more drilling parameters, such as RPM, WOB, flow of drilling fluid, torque etc., and providing a warning or alert to an operator and/or initiating slowing or stopping of drilling when a drilling parameter meets or exceeds a threshold.

For example, if rate of penetration cannot be increased because of a worn drill bit, or if torque would exceed a maximum permitted, or weight on bit would or may exceed a maximum permitted or may cause damage to the drill bit, the alert or warning allows the operator to cease or modify drilling, or drilling may automatically be modified to compensate or alleviate the sensed parameter. WOB may be reduced, torque may be reduced, rate of penetration may be reduced, applied RPM may be reduced, or drilling stopped.

It will be appreciated that one or more forms of the present invention advantageously provides a reliable and robust sensor apparatus or system that can be used to determine the magnitude of the linear movement of a drill bit or other downhole tool into the earth, and preferably relative to time. This provides a sensor arrangement that accurately measures rate of penetration.

Preferably, the rate of penetration (ROP) sensor apparatus or system interfaces with other sensing equipment. For example, the apparatus may be configured to interface with other sensors or sensor device, arrangements or apparatus, such as for detecting or measuring acceleration, inertia, gyroscopic values, force, torque, pressure, vibration, temperature, and (mud) flow, or a combination of any two or more thereof, to assist in tracking wear and tear on the drill bit and predict drill bit changeover times.

The ROP sensor apparatus or system provides means to measure, and either display and record, or communicate measurements for remote display and recording, for the rate of drill bit penetration during a drilling process by measuring angular rotation, such as of the drill string or top drive.

Preferably the sensor apparatus or system may be mounted to a drilling assembly, such as a drilling mast.

More preferably, the sensor may be mounted to the drilling assembly via one or more resilient mounts to reduce or prevent unwanted vibration from drilling affecting the quality of signal produced by the sensor.

Preferably the one or more resilient mounts may include rubber, urethane or other vibration damping materials.

The sensor or sensor apparatus or instrument may be fixedly mounted to the drilling mast or column.

The sensor or sensor apparatus or instrument may have a cable or chord connecting to a moveable portion of a drill string drive assembly. Consequently, as the drill string drive assembly advances as the drill bit bores into the rock at the bottom of the borehole, the cable or chord pays out.

Alternatively, or in addition, the sensor apparatus, instrument or sensor may include one or more of an accelerometer, LIDAR, radar, infrared motion sensor. For example, movement of a drill string into a borehole may be detected by measuring change of distance of a masthead or top drive towards the ground or other fixed component/feature.

Angular measurement may be obtained by use of a rotary or shaft encoder, such as an optical disc or shaft encoder. The encoder may be operated by a chord or cable, such as a drawstring, connected to the drill rig (such as the drilling mast) so that the chord or cable extends from an encoder body and thereby causes rotation of an encoder component to produce values equating to distance the chord or cable has extended.

The cable or chord may be connected to a shaft in the sensor, which shaft rotationally drives an encoder disc, such that, as the chord or cable pays out, the rotary encoder disc rotates and provides an angular measure of the length of extent of the chord or cable, this correlating with the distance the drill drive has advanced, and therefore a measure of the distance the drill bit has advanced.

Preferably angular measurement from the encoder combined with the time taken for an associated penetrating movement is displayed as the rate of penetration of the bit (distance divided by time). Also, change of rate of penetration can be determined i.e. acceleration (advancing into the borehole) or deceleration (retraction from the borehole.

The sensor apparatus or system may communicate wirelessly from the drill mast to a remote measurement processing and data storage location. Thus, the sensor may communicate angular position values to a processor which creates a measure of distance from the angular measurements.

Incorporating GPS time of day and/or computer processing ensure(s) that the ROP measurement is recorded accurately and reliably.

It will be appreciated that one or more embodiments of the method, apparatus or system of the present invention may incorporate wireless technology to wirelessly transmit ROP data from the drill rig to a remote data receiver/processor.

As an example, the sensor providing a measure of penetration of the drill bit may be arranged and configured to provide such distance data to a remote computer or logging apparatus/system. Such a wireless arrangement enables retro integration of the apparatus/system of the present invention with old or new drill rigs.

One or more embodiments of the present invention may include an energy harvester, such as a vibrational energy harvester, to generate sufficient energy to power the apparatus or system or components thereof. Thus, power supply from the drilling rig main power supply need not be required. Beneficially, the apparatus or system may be self contained in terms of its own power supply when it is powered from its own energy harvester. For example, vibrational energy created by operation of the drilling rig can be converted into electrical energy and either used to power the apparatus/system or stored (via a battery and/or capacitor storage set-up) for later use.

In relation to onshore mineral exploration drill rigs, current technology for measuring ROP is unreliable due to vibration and exposure to the weather. A particular benefit of at least one embodiment of the present invention is that the apparatus or system may be hermetically sealed against ingress of moisture and dirt.

At least one embodiment of the present invention may also or alternatively include a resilient mounting system to advantageously prevent vibrations from drilling operations causing errors in the ROP measurement data.

Geological models and data from previously drilled holes may be combined with drilling data obtained for comparison with drilling data obtained for a borehole being drilled to help determine drilling performance indicators for that borehole, such as a drill bit wearing too much, too quickly or to indicate when a bit needs to be changed. Such data can be displayed on a display screen associated with the apparatus/system.

Drilling data, including the ROP measurements, may be handled and/or communicated using a common protocol shared by a number of apparatus or systems of the drill rig.

For example, an apparatus or system according to an embodiment of the present invention may communicate rate of penetration data to a sub, such as to a wireless sub, and/or other peripherals handling drilling related data associated with that drill rig.

Preferably, real time ROP information may be displayed on a display screen, such as by a 'dashboard' style software application. For example, ROP in millimetres per second (mm/s), millimetres per minute (mm/min) or metres per minute (m/min) may be displayed.

One or more embodiments of the present invention may sense the distance advanced (amount of penetration, say, in mm) by the drill bit over a known or calculated period of time, and this may be displayed as ROP. Time rate of change of ROP may also be calculated to determine sudden acceleration or deceleration of the drill bit (such as suddenly penetrating a void or softer rock/sand).

Status information may also be displayed. Status information may shown whether ROP has increased or decreased over time. Also torque on bit, weight on bit, RPM and/or drilling fluid pressure/flow rate may be displayed.

Detection of one or more thresholds may be provided. For example, one or more detectors to provide an indication or warning to be displayed to an operator. Action can then be taken to modify drilling activities, such as reducing WOB, slowing down RPM, increasing drilling fluid flow.

It will be appreciated that it is highly advantageous to rock drill operators to be able to measure wear and tear of deep-bore (diamond) hard rock drills so that drilling operators know more accurately and reliably when the expensive operation of changing a drill bit needs to be carried out.

For example, on average, a diamond-tipped drill may penetrate through 30 metres of hard rock per 12-hour shift, at an average of 2.5 m an hour.

Changing a drill bit, even at shallow borehole depths of only a few hundred metres, can take two hours to complete. This equates to 5 m of lost drilling productivity, increased operating costs in personnel time and running/site costs, and valuable production time. A bit that is worn out too early is financially costly to correct, depending on the materials used and this cost could occur several times in a week until drill operators pick up the field incident via their daily drilling reports.

Comparing drill bit penetration rate (ROP) to logs of previously drilled holes can help to confirm if a drop in the penetration rate is due to geological formation or the stratified nature of the borehole. Utilising at least one embodiment of the present invention, this rate of penetration and geological comparison can be calculated automatically via a central computer in a user interface.

Threshold detectors can warn operators when optimisation parameters have dropped, to inform the driller that a bit needs to be changed.

During diamond core drilling, a bore hole is drilled into the earth by the drill rig by driving a rotating hollow shaft with a diamond impregnated bit attached at the bottom of the drill string. As the bore hole is drilled deeper into the earth, the drill string is lengthened by adding rods at the surface.

One or more embodiments of the ROP apparatus or/system of the present invention measures the rate of penetration of the drill bit as the rock is eroded by the cutting action of the diamond bit. During this operation, the drill fluid flows down the hollow drill stem through the bit and is forced back to the surface carrying the drill cuttings to the surface as well as providing lubrication and cooling of the bit.

"The physical condition of a drilling bit, the rate of rotation, weight applied to the bit and the viscosity of the drilling fluid and the rate of fluid around the flow loop are important measurements. During drilling, the only variable that cannot be detected directly is the physical condition of the bit. The capacity and capability to measure drill bit condition can be provided by applying constant weight on bit (WOB) and rate of rotation (RPM) then monitor penetration rate of the borehole as rock is diminished and the hole progresses. Decreasing penetration rates can be a sign of a deteriorating bit.

In most drilling scenarios, rate of penetration measurement is a manual calculation usually determined as a function of time over a certain depth of penetration. Such manual calculation introduces risk of user error.

However, due to the accuracy of the present invention very small increments of depth penetration can be determined over fixed time intervals to determine the depth of cut.

The user interface can provide clear digital readouts for an operator and a charted history feature for real time and post drilling analysis.

Operators will be able to assess and compare the performance of their drillers across their entire fleet of drill rigs. The data will be sent remotely to a base as a monitor for daily performance.

An important benefit of the apparatus or system of the present invention is its immunity to erroneous measurements caused by the vibration during the drilling process.

One or more embodiments of the present invention may include sending an electromagnetic signal, such as a light signal e.g. visible or IR laser light to a detector, the time of flight relating to distance between the transmitter and detector. Any change in distance between the transmitter and detector denotes a movement of one relative to the other, such as movement of a part of the drill string or top drive towards a base of a drilling mast.

The electromagnetic signal can be transmitted to a reflector and returned to a detector at or near to the transmitter i.e. bouncing a signal off a reflector.

The detector may receive the time of flight signal and process it as distance travelled or velocity.

For example, an electronic sub in the drill string may include the electromagnetic signal transmitter and/or the detector. That is, the sub may include the transmitter to emit the EM signal to the detector located remotely, such as on a fixed part of the mast, or may include the detector and a separate reflector is provided on a fixed part of the mast. Thus, in one scenario just the one direction time of flight is use, or the reflected two direction time of flight may be used.

The transmitter of the electronic sub may send an optical (visible light) or IR signal.

It will be appreciated that one or more embodiments utilises separate sender (transmitter) and receiver, such as using optical apparatus i.e. no electronic sub instrument, the transmitter and receiver or a transmitter, receiver and reflector being on the drill rig the mast (either the transmitter and receiver moving and the reflector being fixed; or
the reflector moving and the transmitter/receiver fixed; or
the transmitter moving and the receiver fixed; or
the receiver moving and the transmitter fixed.

The detector may send data to a remote computer wirelessly. The sub may receive the signal (reflected or direct) and combine that data with other data then sent wirelessly to the remote computer. Alternatively, a detector at a fixed position of drill rig sends the signal to the remote computer. Alternatively, the transmitter sends a signal from a fixed position of the rig to a reflector, then mast sensor receives and processes processes data and sends to the remote computer.

BRIEF DESCRIPTION OF THE DRAWINGS

One or more embodiments of the present invention will hereinafter be described with reference to the accompanying drawings, in which.

DESCRIPTION OF PREFERRED EMBODIMENT(S)

Figure 1:
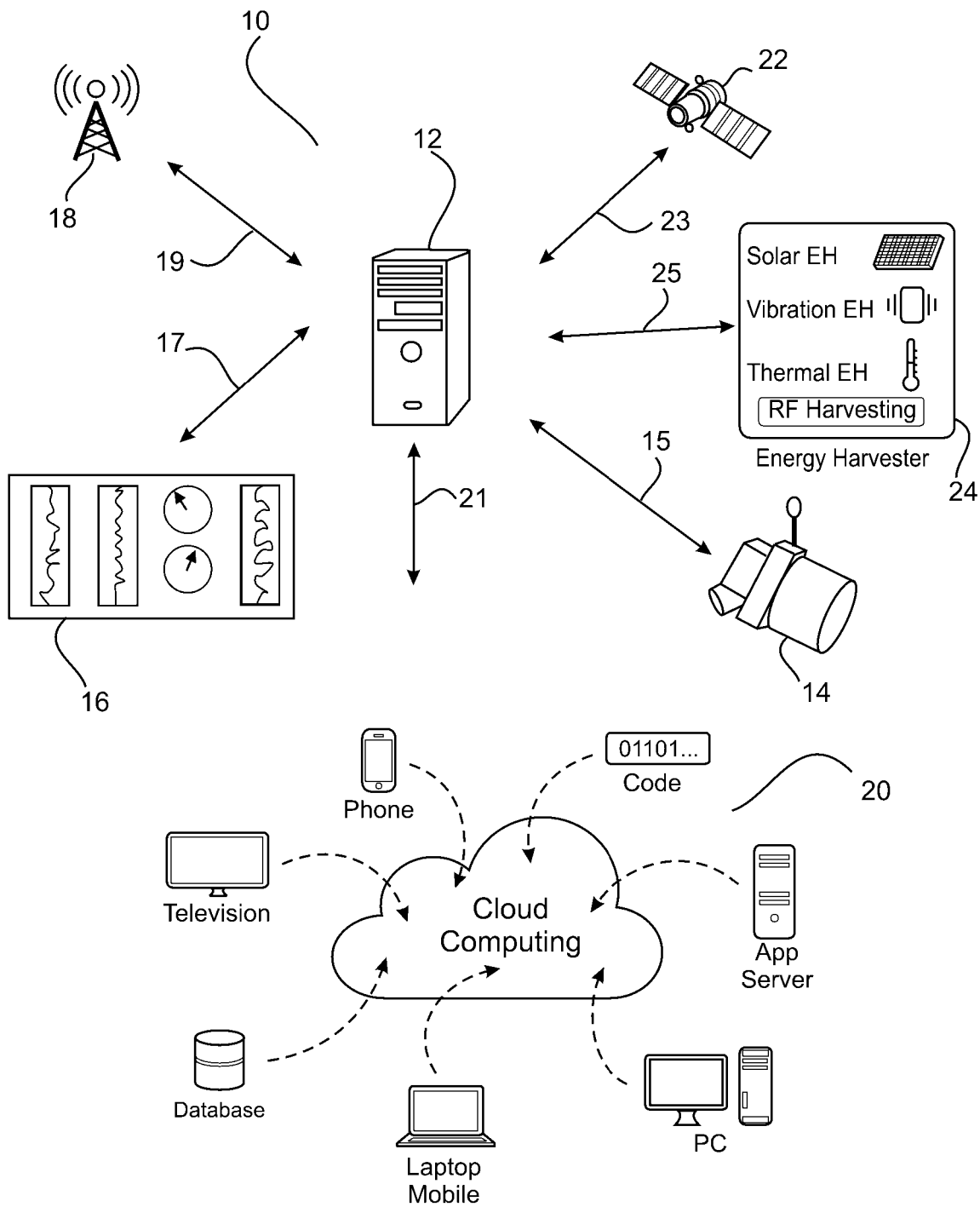
FIG. 1 shows a schematic arrangement of an embodiment of the present invention associated with a drilling operation.

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented.

It will be readily understood that the aspects of the present disclosure, as generally described herein and illustrated in the drawings can be arranged, substituted, combined, separated and designed in a wide variety of different configurations, all of which are contemplated in this disclosure.

One or more forms of the present invention find(s) particular application in diamond hard rock boring applications in the field of mineral exploration.

During diamond drilling, a bore hole is drilled into the earth by the drill rig by driving a rotating hollow shaft with a diamond impregnated bit attached at a fixed position of the drill string.

As the bore hole is drilled deeper into the earth, the drill string is lengthened by adding rods at the surface.

The ROP sensing apparatus/system of the present invention measures the rate of penetration of the drill bit as the rock is eroded by the cutting action of the diamond bit. During this operation, the drill fluid (e.g. drilling mud) flows down the hollow drill stem through the drill bit and is forced back to the surface carrying the drill cuttings to the surface as well as providing lubrication and cooling of the drill bit.

One or more embodiments of the present invention can obtain the following measurements: the physical condition of a drilling bit, the rate of rotation of the drill bit, weight applied to the drill bit (such as by the downward pressure from the weight of the drill rods attached above the drill bit as well as the downward applied force from the drill rig), the viscosity of the drilling fluid and the rate of fluid around the flow loop down and back up the borehole.

During drilling, a variable that cannot be detected directly is the physical condition of the bit.

A method that can be used to measure drill bit condition is to apply constant weight on bit and rate of rotation then monitor penetration rate of the borehole as rock is diminished and the borehole progresses. Decreasing penetration rates can be a sign of a deteriorating drill bit.

One or more forms of the present invention advantageously provide for very small increments of depth penetration to be determined or measured, and preferably, penetration distance over fixed time intervals to determine the rate of the depth of cut. Such very small increments can be measured by one or more embodiments of the present invention in the millimetre or sub millimetre ranges, such as +/−1.0 mm.

Preferably a user interface has clear digital readouts/display(s) and preferably a charted history feature for real time and post drilling analysis. Operators benefit from being able to assess and compare the performance their drillers across their operating drill rig fleet.

ROP related data obtained by the present invention can be communicated to a remote location to provide a record and monitoring of daily performance of the drilling operation(s).

One or more embodiments of the present invention advantageously provide(s) for reduction or avoidance of erroneous measurements caused by vibration during the drilling process.

Calculation of ROP from a position signal requires differentiation, which can amplify high frequency noise, and given that the total range of the position signal is of the order of 10 m, there can be a trade-off in bandwidth between acceptable noise and signal response. Therefore, to maximise the signal-to-noise ratio, a distance sensor with digital output can be used to avoid the introduction of any noise during the transmission of the signal between the distance sensor and data acquisition system, and any noise introduced by the data acquisition system itself.

As such, one or more distance sensors with either a pulse or SSI digital output can be used given they can be synchronised with other signals measured by a data acquisition system, and are supported by a large range of the data acquisition systems.

Furthermore, most data acquisition systems that can interface with these type of signals are also capable of providing the sensor power supply, which avoids the need for external power supplies to the distance sensor(s).

Given that the distance sensor may need to be retrofitted to an existing drill rig, the distance sensor can have a mounting arrangement configured for various mounting position options.

A 'draw wire' sensor with rotary encoder has been determined to be a useable type of distance sensor, such as a Micro-Epsilon WDS-10000-P115-TTL or WDS-10000-P115-SSI draw wire sensor.

One or more embodiments of the present invention may incorporate an optical shaft encoder.

For example, an optical shaft encoder can be adopted which measures angular displacement. For example, measuring 0° to 360° divided by 4096 counts provides a resolution of angular displacement of approximately 0.09°, which provides a measure of movement of the encoder, and therefore of the drill string, in microns.

The chord or cable draw string of the sensor pulls the encoder, converting angular to linear displacement. One or more timers or clocks can be used to help determine rate of movement (and therefore ROP) by differentiating the distance measure with respect to time. Use of one or more GPS clocks provides an accurate time measure and therefore a rate that becomes linear velocity.

An alternative or additional sensor may include at least one of: an accelerometer or multi-axis accelerometer, one or more electromagnetic wave sensors—such as one or more of a LIDAR sensor, MEMS mirror, radar sensor, microwave sensor, infrared sensor, and/or at least one gyroscopic sensor.

One or more of the aforementioned sensors can be provided at the surface and/or downhole. For example, one or more accelerometers and/or electromagnetic wave sensors may be provided on a masthead to detect movement of a drill string or top drive as the drill string is advanced into the ground during drilling. Rate of penetration and or distance travelled can be measured by a change in distance detected by the sensor and/or by changes in motion/movement.

One or more optical sensors may be provided to sense advancing movement as the drill advances and/or to sense rate of penetration. For example, one or more cameras may be provided to move as drilling advances. The one or more cameras may observe a fixed indicator. Change in relative size of features the fixed indicator can be used to determine change in distance from the camera(s) to the indicator. Change in spacing between multiple indicators may also or alternatively be used to determine change in distance.

It will be appreciated that the indicator(s) can move with the advancement of drilling whilst the camera(s) remains fixed i.e. the opposite of the aforementioned setup.

A resistance sensor, such as a magneto-resistive sensor, may be used to determine movement indicating rate of penetration or advancement of the drilling, or both. For example, the magneto-resistive sensor may use magnetism/electromagnetism to detect a change in resistance relative to a fixed member in order to indicate change in distance or rate of change of movement.

It will be appreciated that one or more embodiments of the present invention provides a reliable measure of instantaneous rate of penetration (ROP).

As a result of utilising the present invention, drilling performance can be assessed objectively based on the obtained ROP and other preferred parameters, such as weight on bit (WOB).

Furthermore, by utilising the present invention, it is possible to track evolution of drilling performance over time and/or borehole depth.

Also, utilising the present invention enables a drill operator to assess the effect of control parameters on ROP, and thereby maintain or modify a current drilling activity for optimisation.

Utilising the present invention, it is preferably possible to generate a reporting plot of drilling performance measures, such as ROP vs depth, a histogram/chart of ROP per rod or depth, such as at 30 m, 100 m depth etc. Mean and variance in ROP can also be monitored and reported.

In use, as a drill bit advances into a borehole during drilling, the chord or cable extends from the encoder. The advanced distance is measured by the encoder. Comparing this distance to time taken to advance, a rate of penetration is calculated. An operator or an automatic control system then controls one or more drilling parameters to keep the drilling operation within required limits. If the rate of penetration is too slow (leading to poor productivity), the operator or system may speed up RPM and/or may increase WOB. Alternatively, if ROP is too high (risking premature wear or damage to the drill bit), RPM or WOB may be decreased.

Automatic control of drilling can be provided with a feedback of the continuously or periodically monitored ROP. Real time monitoring of ROP enables drill rig operators to optimise drilling to prevent premature wear or failure of the drill bit.

As shown in FIG. 1, an embodiment of the present invention provides a system 10 of obtaining and utilising rate of penetration measurements. An encoder 14 provides 15 distance data to a computer 12. The encoder is of the drawstring type whereby the free end of the drawstring is attached to a drilling assembly that advances with the drill bit as drilling progresses. The drawstring causes an internal rotary encoder to rotate, providing a measure of distance advanced. The computer or other timer can associate the distance measured with a time elapsed during that advancement. Thus, real time rate of penetration measurement can be calculated and displayed 17 and/or reported 21.

The time component can be obtained 23 from satellite 22 (GPS) timing for accuracy.

Other sensors provide measures, such as RPM, torque, flow and/or pressure of drilling fluid etc., which are shown, along with the ROP measurement on a display 16.

Power for the system 10 or the sensor/encoder 14 can be obtained from energy harvesting 25, such as by harvesting energy 24 from drilling vibrations, temperature fluctuations, solar energy, wind power, and/or a combination of one or more thereof.

Reports 20 can be produced 21 providing monitoring and records of drilling operations. Furthermore, reports and/or data from other drilling operations can be combined with data from the present drilling operation, such as a comparison of rate of penetration data across different drilling rigs, to derive a useful understanding of the type and variability of rock strata at depths. This information can be used to plan other drilling operations and/or where mineral deposits might be found or not found.

The system can utilise wireless 18 communications. For example, the encoder mounted high up on a drilling mast of a drilling rig may communicate 19 wirelessly to a computer or other receiver apparatus communicating with the computer. This avoids the need for installation of communication cables, and power cables may be shortened by connection to the energy harvesting system 24.

Figure 2:
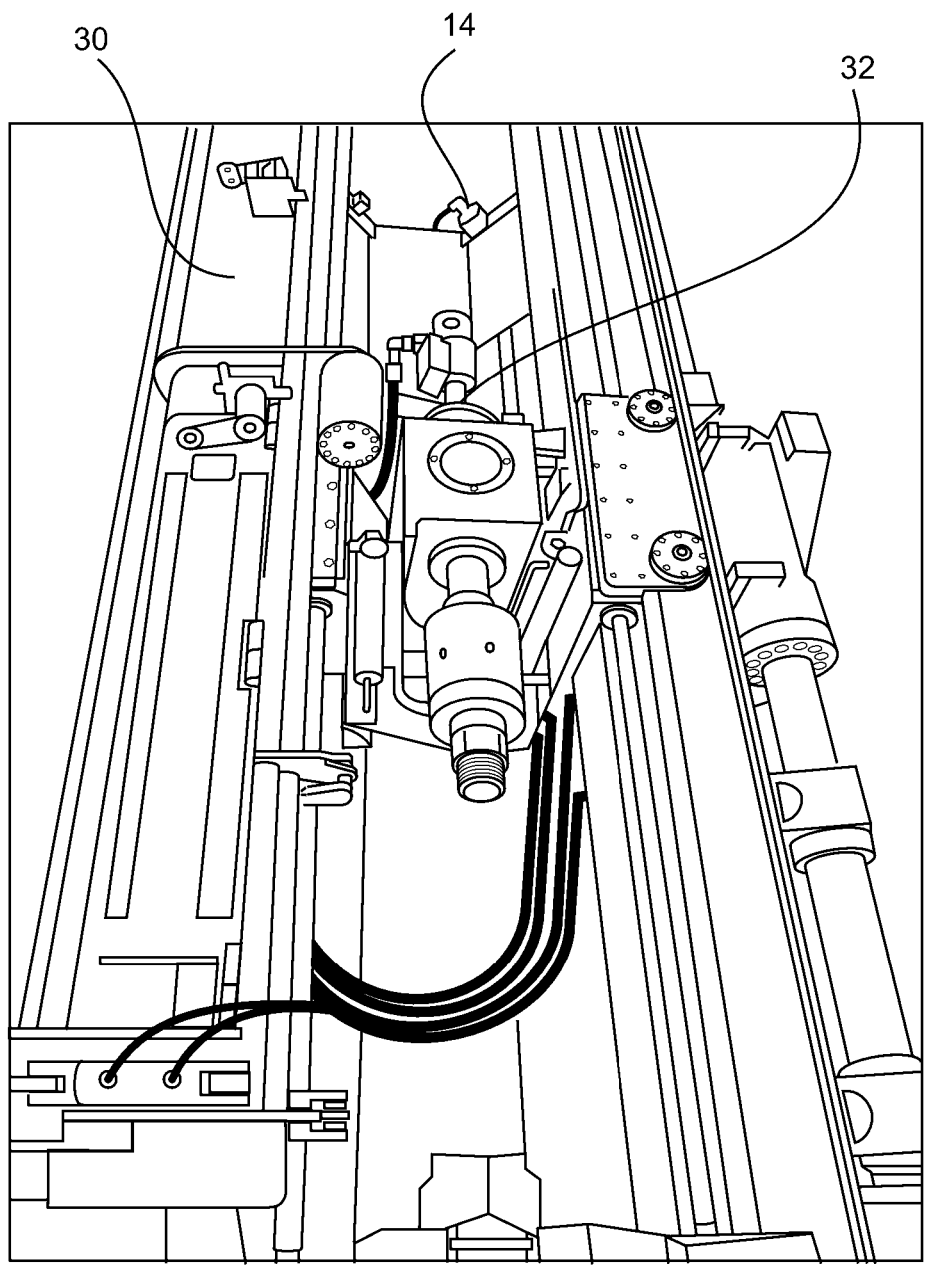
FIG. 2 shows a drawstring type distance encoder mounted to a drilling rig in relation to an embodiment of the present invention.
Figure 3:
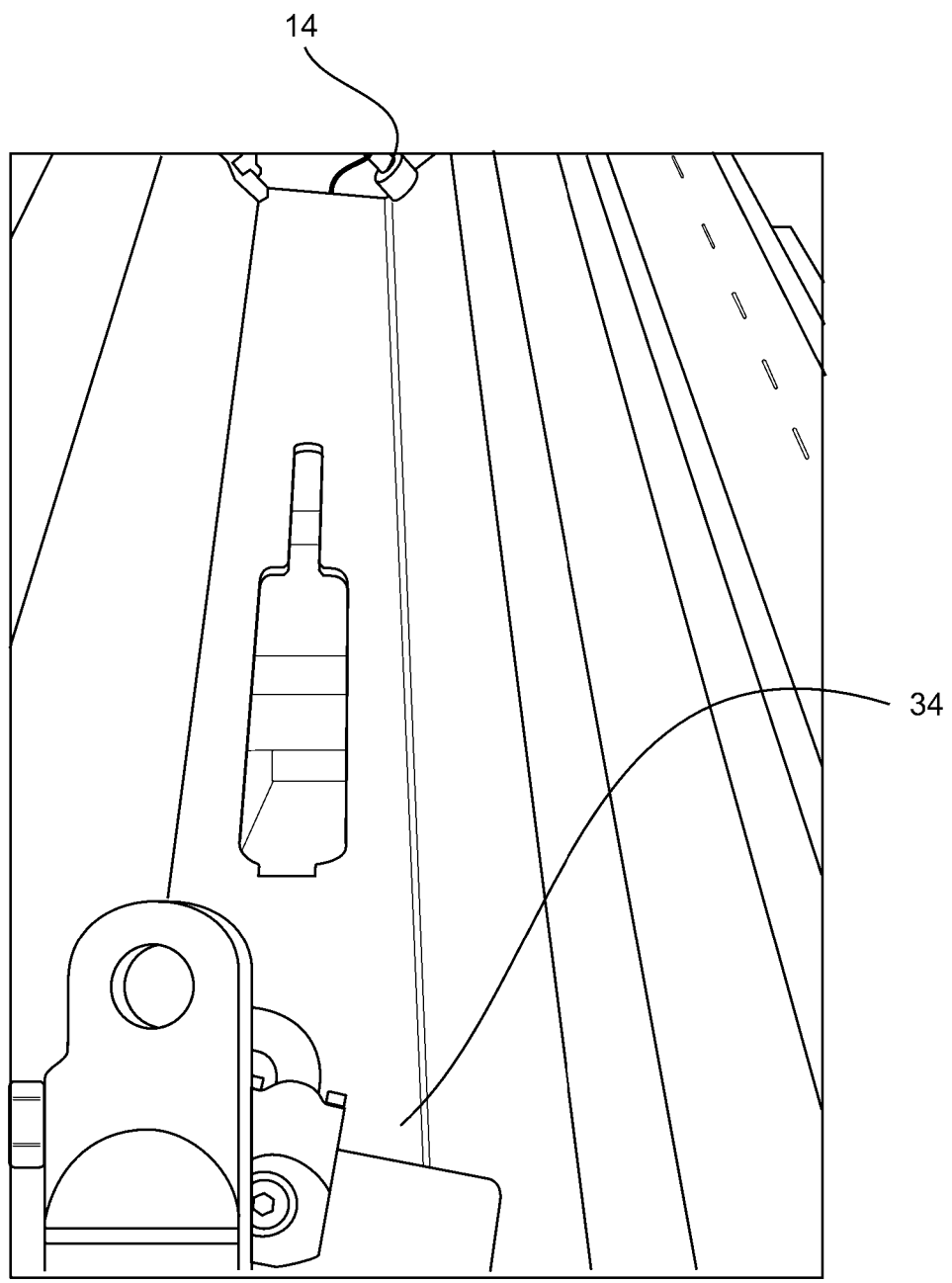
FIG. 3 shows an alternative view of the features shown in FIG. 2.

As shown in FIGS. 2 and 3, a distance encoder 14 (in this embodiment being a drawstring operated encoder for measuring distance) is mounted to the mast 30 of a drill rig. The free end 34 of the drawstring is attached to the movable top drive assembly 32. As the top drive assembly advances downwards during drilling when the drill bit is penetrating the rock, the drawstring is pulled, which causes the rotary apparatus within the housing of the encoder to indicate a distance measure in real time.

Figure 4:
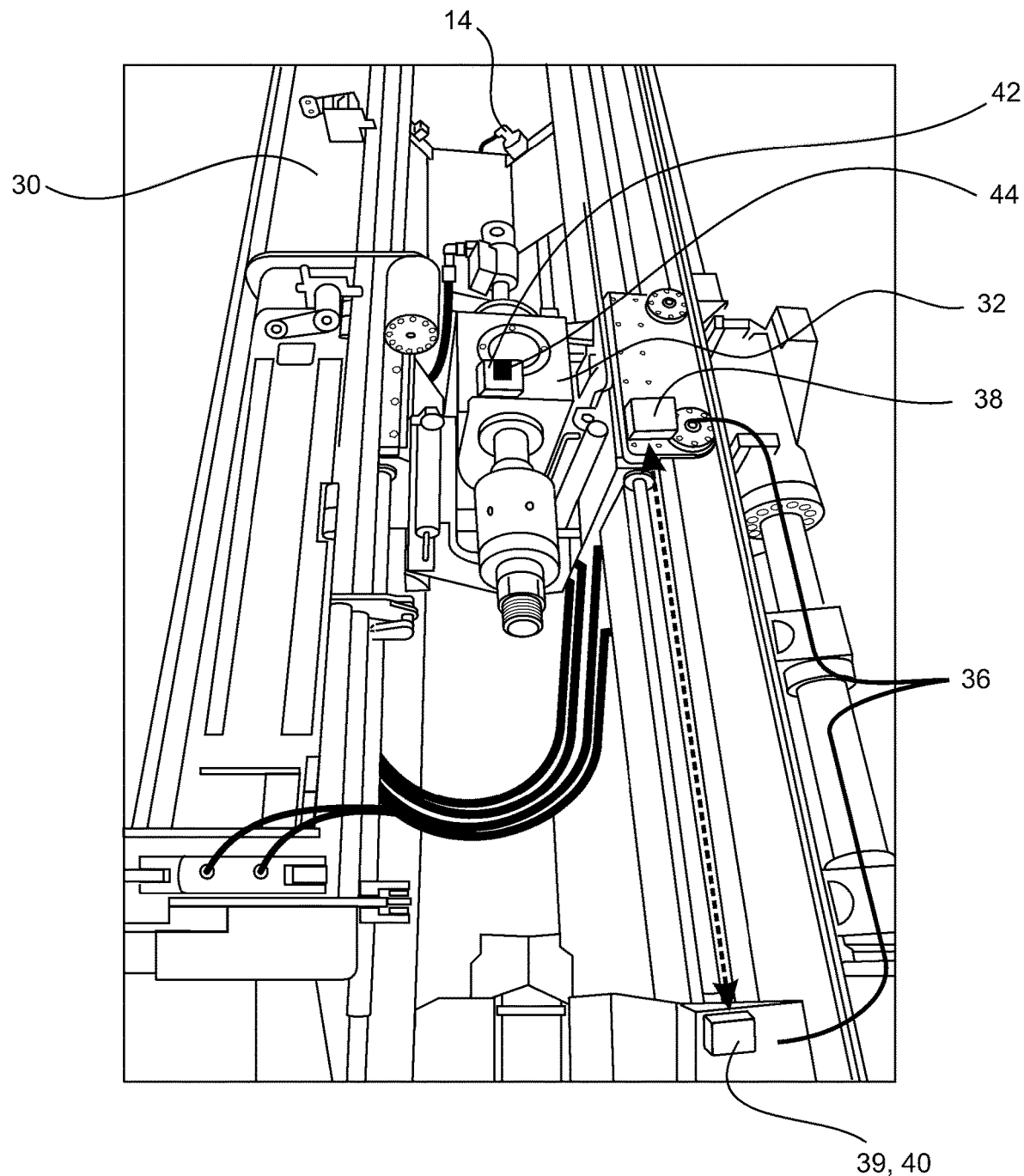
FIG. 4 shows at least one alternative embodiment of the present invention.

As shown by way of example in FIG. 4, instead of, or in addition to, a distance encoder referred to in FIGS. 2 and 3, one or more embodiments of the present invention may include at least one distance sensor utilising electromagnetic wave detection and/or acceleration and/or gyroscopic effects. Rate of penetration and/or distance travelled as the drill string advances during drilling can be detected by measuring, at the surface, the change in distance of a travelling component of the masthead relative to a fixed component.

For example, as shown in FIG. 4, an electromagnetic wave apparatus 36 measures 'time of flight' and/change in 'time of flight' of an electromagnetic signal, such as relative to a transmitter/sender 38 and reflector 39 or detector/receiver 40 arrangement.

Alternatively, or in addition, one or more motion detection apparatus 42, such as one or more accelerometers or and/or gyroscopic apparatus 44 may be provided to detect changes in movement/motion of the drill string, such as rate of change of motion of the masthead as the drill string advances.

It will be appreciated that the accelerometer(s) may include a tri-axial-accelerometer.

The motion sensor apparatus and/or the distance sensor may be battery powered, such as having an internal rechargeable or replaceable battery, and/or may use vibration for energy harvesting, such as via an internal piezoelectric apparatus.

Figure 5:
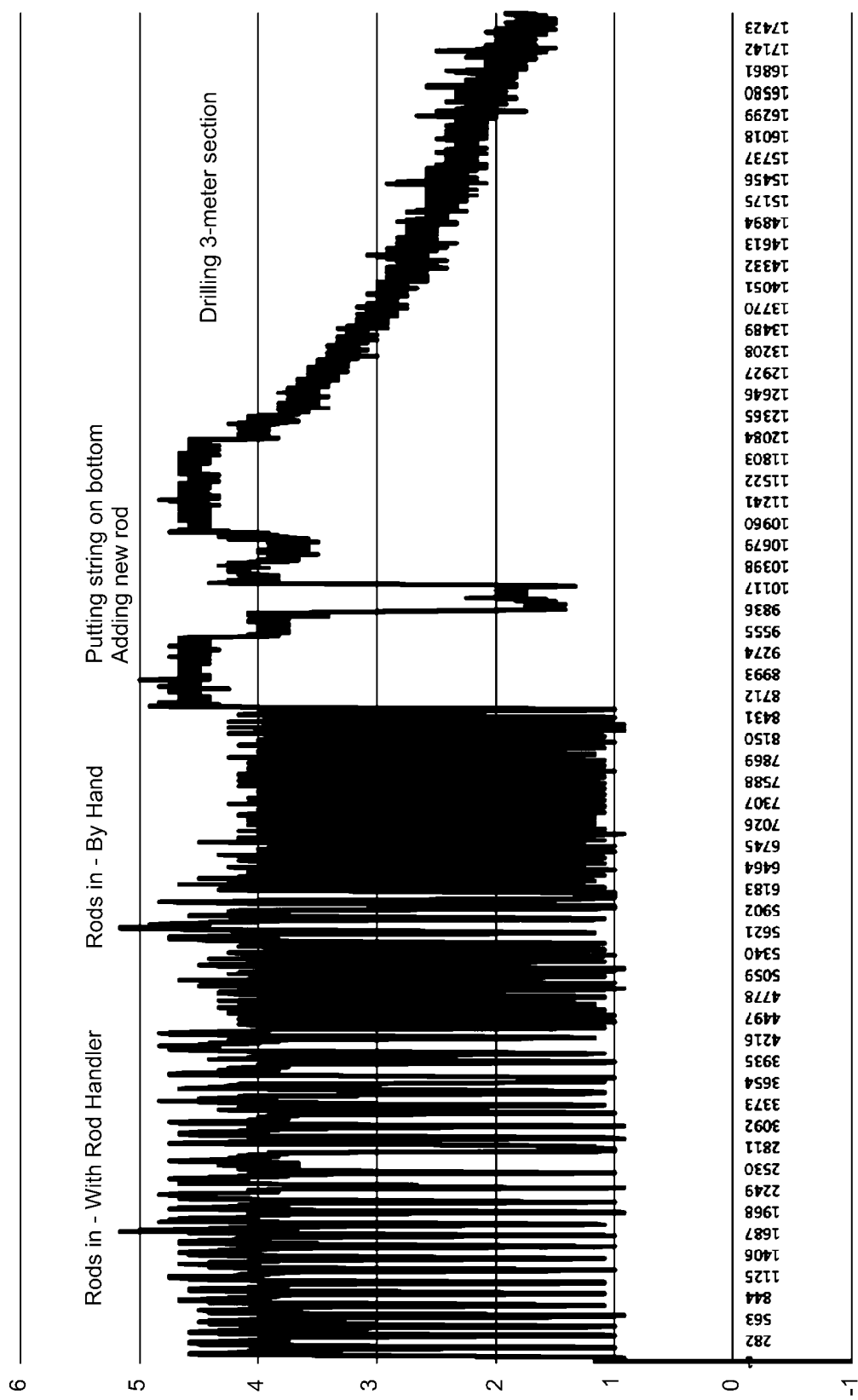
FIG. 5 shows a chart of variation of height through measured change in atmospheric/barometric pressure for advancement of a drill/drillstring for a drilling operation according to an embodiment of the present invention.

As shown with regard to FIG. 5, atmospheric or barometric pressure changes can be used to measure/detect changes in altitude/height.

Preferably at least one sensor apparatus detects changes in barometric or atmospheric air pressure. At least one other sensor apparatus can be provided to detect barometric or atmospheric air pressure as a reference against which to compare the changes detected by the at least one sensor apparatus.

For example, the at least one other sensor apparatus may be mounted or attached to a lower portion of a drilling equipment, such as a stickup of a pipe casing from a drilling operation, to provide the reference pressure.

At least one sensor apparatus can be mounted to or attached to a movable portion of a drilling rig/mast or to a drill pipe to be advanced towards or into the ground.

Attachment or mounting for any of the sensor apparatus may be by magnets removably attaching the respective apparatus(s) to metal structure of the drilling equipment, such as the drill mast/rig or stickup or other suitable site equipment.

Any changes to the pressure sensed by the at least one sensor moving up or down during drilling operations as the drill respectively advances or is withdrawn can be compared to the fixed reference and a determination of rate of penetration, advancement/distance the drill rods/bit have progressed and/or rate or distance of withdrawal from the drill hole, can be determined.

FIG. 5 shows distance in metres on they axis derived from change of sensed atmospheric/barometric pressure relative to incremental counts on the x axis.

The right hand section of the chart clearly shows the drilling progress, of around 3 metres (from approximately a relative height of 4.5 m progressing to a relative height of approximately 1.5 m) with respect to a reference value.

The sensor apparatus may be programmed to detect one another, such as by push button calibration by a user or automatically when in range or in contact with each other. For example, 'bumping' two said sensor apparatus together may be used to activate calibration to the present temperature and/or air pressure at that position.

Alternatively or in addition, one or more of the sensor apparatus can include a transmitter and/or receiver arranged and configured to communicate respective data sensed or measured by the respective apparatus, such as one or more of a value or change in value of sensed atmospheric/barometric air pressure, distance, acceleration/deceleration, altitude, speed, rate of change of acceleration or deceleration (aka 'jerk'), temperature and/or humidity. The sensed or measured data can be transmitted to a remote apparatus, such as a computer, tablet, laptop, data recorder etc., for instantaneous readout and/or later processing.

Figure 6:
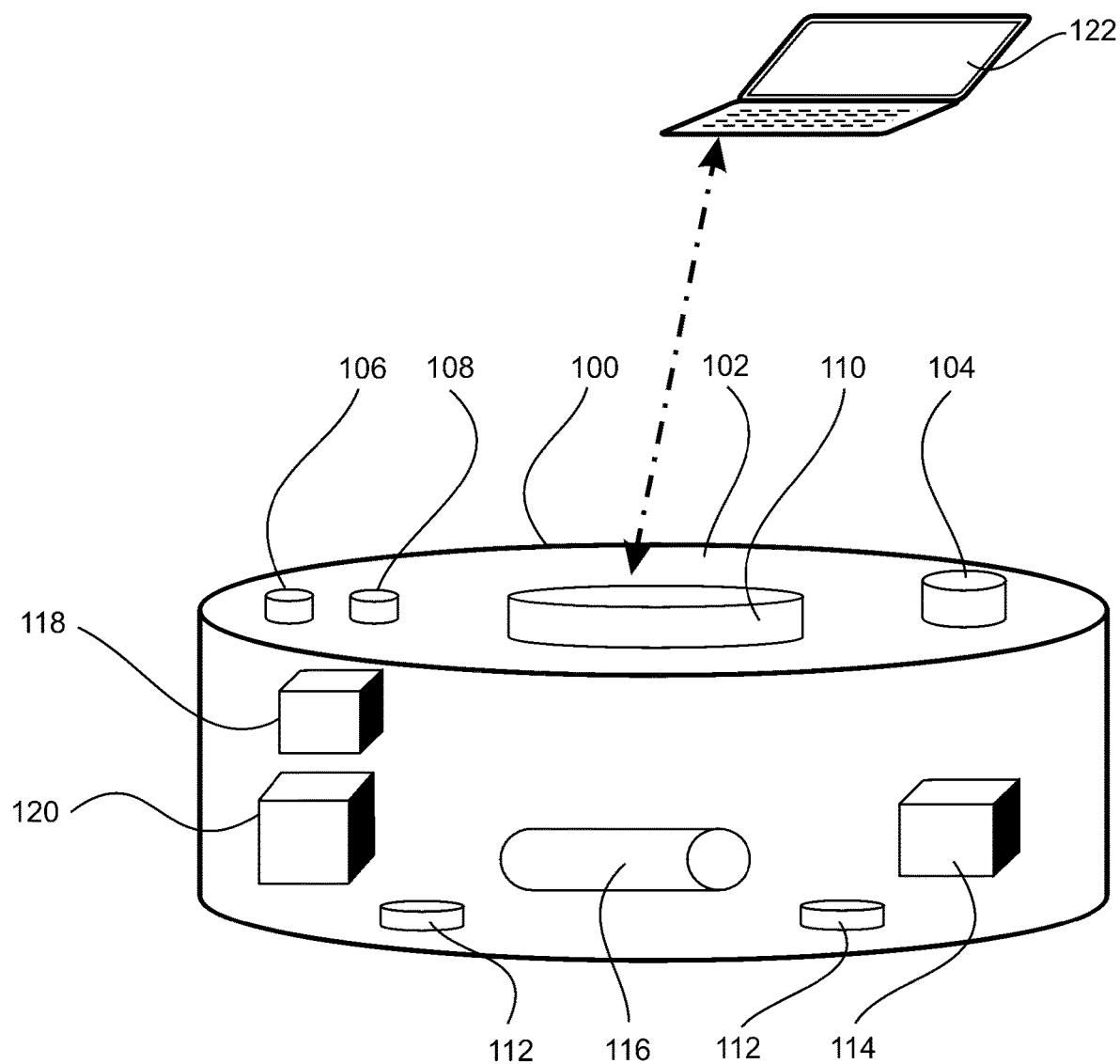
FIG. 6 shows an example of a sensor apparatus according to an embodiment of the present invention.

As shown by way of example in FIG. 6, a sensor apparatus 100 of an embodiment of the present invention includes a body 102.

A control button 104 can be provided to initiate/start the apparatus and/or to have the apparatus calibrate to a reference and/or to a similar apparatus and/or to a computer 120, such as a laptop.

One or more indicator lights, such as lights 106, 108 can be provided. One or more of the lights can show that data is recording and/or has successfully recorded or been transmitted, or that the apparatus is operating correctly, or that the apparatus has successfully set to a reference value, or that the apparatus is on/off, or that the apparatus is communicating data, or combinations of two or more thereof.

The body houses a transmitter and/or receiver apparatus 110 for transmitting and/or receiving data.

The body can include attachment means, such as one or more magnets 112 for magnetically removably attaching the sensor apparatus to equipment, such as to a drilling mast. The magnets may allow two or more of the sensor apparatus to be attached together for storage and/or transport, reducing the risk of the apparatus being inadvertently separated, which can be particularly useful if the apparatus are used in pairs wherein they can be calibrated together and then one set in a fixed position and the other attached to move with movement of the moving portion of the equipment to which it is attached.

The sensor apparatus can include at least one atmospheric air/barometric pressure sensor to detect an air pressure value and/or changes in air pressure.

The sensor apparatus can include at least one battery 116. Alternatively, or in addition, energy harvesting means 118, such as a piezo-electronic energy producer harvesting vibrational energy from movement of the apparatus in use, may be provided. The battery may be charged from surplus harvested energy.

One or more other sensors 120 may be provided instead of or in combination with the atmospheric air/barometric pressure sensor. For example, humidity sensor, one or more accelerometers, one or more gyroscopes, or a combination of any two or more thereof.

Figure 7:
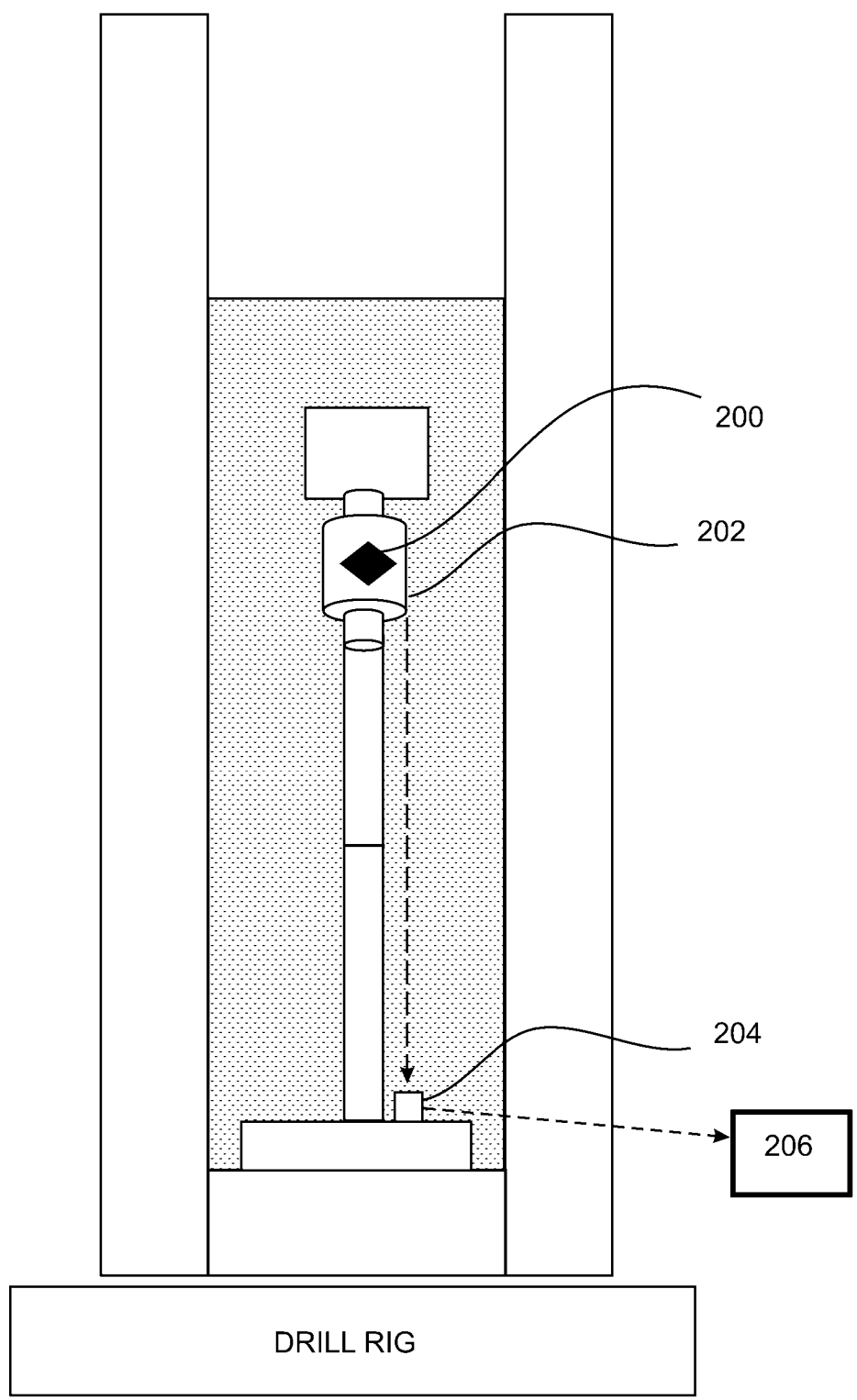
FIG. 7 shows a transmitter/sender for sending an EM signal, such as a light, laser, optical, IR signal) to a detector, and the detector sends data to a user interface/computer wirelessly, according to an embodiment of the present invention.

As shown by way of example in FIG. 7, a transmitter/sender 200 (e.g. an EM (optical, laser, IR) mounted on a moving part of a drill rig 202, such as an electronic sub, part of the drill string, top drive, transmits a signal to a detector/receiver 204. The receiver/detector can transmit time of flight/distance data to a remote user interface/computer 206.

Figure 8:
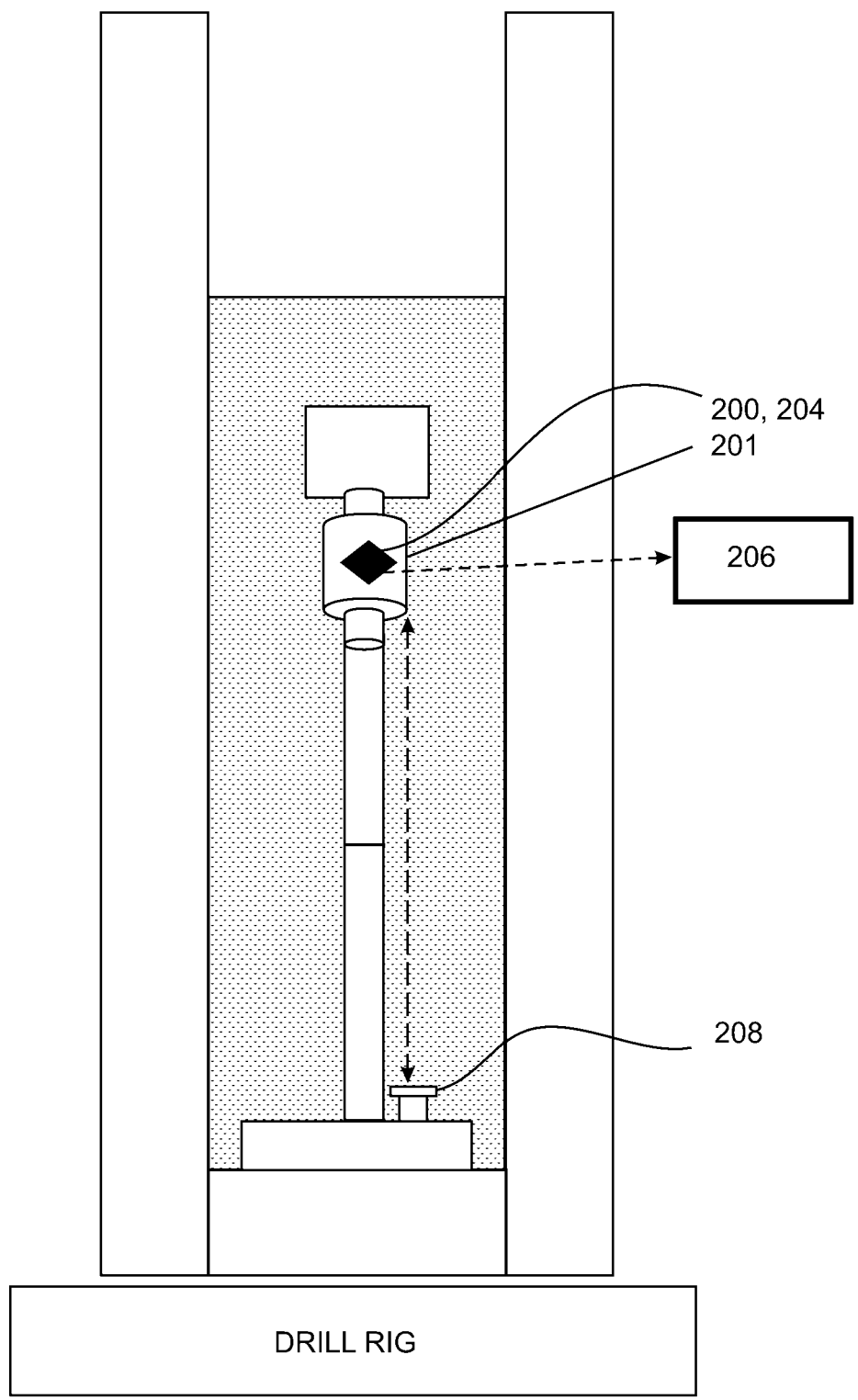
FIG. 8 shows the EM signal sent by a transmitter/sender from an electronic sub to a reflector, and receives the reflected signal back, then this data is optionally combined with all the other data, then sent wirelessly to the user interface/computer, according to an embodiment of the present invention.

FIG. 8 shows an EM signal sent by a transmitter/sender 200 from an electronic sub 201 to a reflector 208, and receives the reflected signal back, then this data is optionally combined with all the other data, then sent wirelessly to the user interface/computer 206, according to an embodiment of the present invention.

It will be appreciated that a transmitter/sender and/or receiver/detector mounted on a rotating portion of the mast, such as on an electronic sub, may be utilise din a system embodying the present invention wherein averaging of the transmitted/received signal and detector values to produce an accurate distance/velocity can be used. A high number of signals, particularly in the case of laser/optical/IR light signals is possible due to the large number of samples in a revolution. For example, 1000 RPM provides 16 rotations in one second. The average measurement for laser is around 20 Nano seconds, and sampling at, say, 50 Hz, provides a high sample rate at different points of the rotation. Vibration may be detected/measured by such a sensor arrangement. The reflector may be annular/circular, and an annular/circular apparatus at the base of the rig may be provided for maximum resolution. Around 16 Hz sampling may be achieved with one reflection point.

Figure 9:
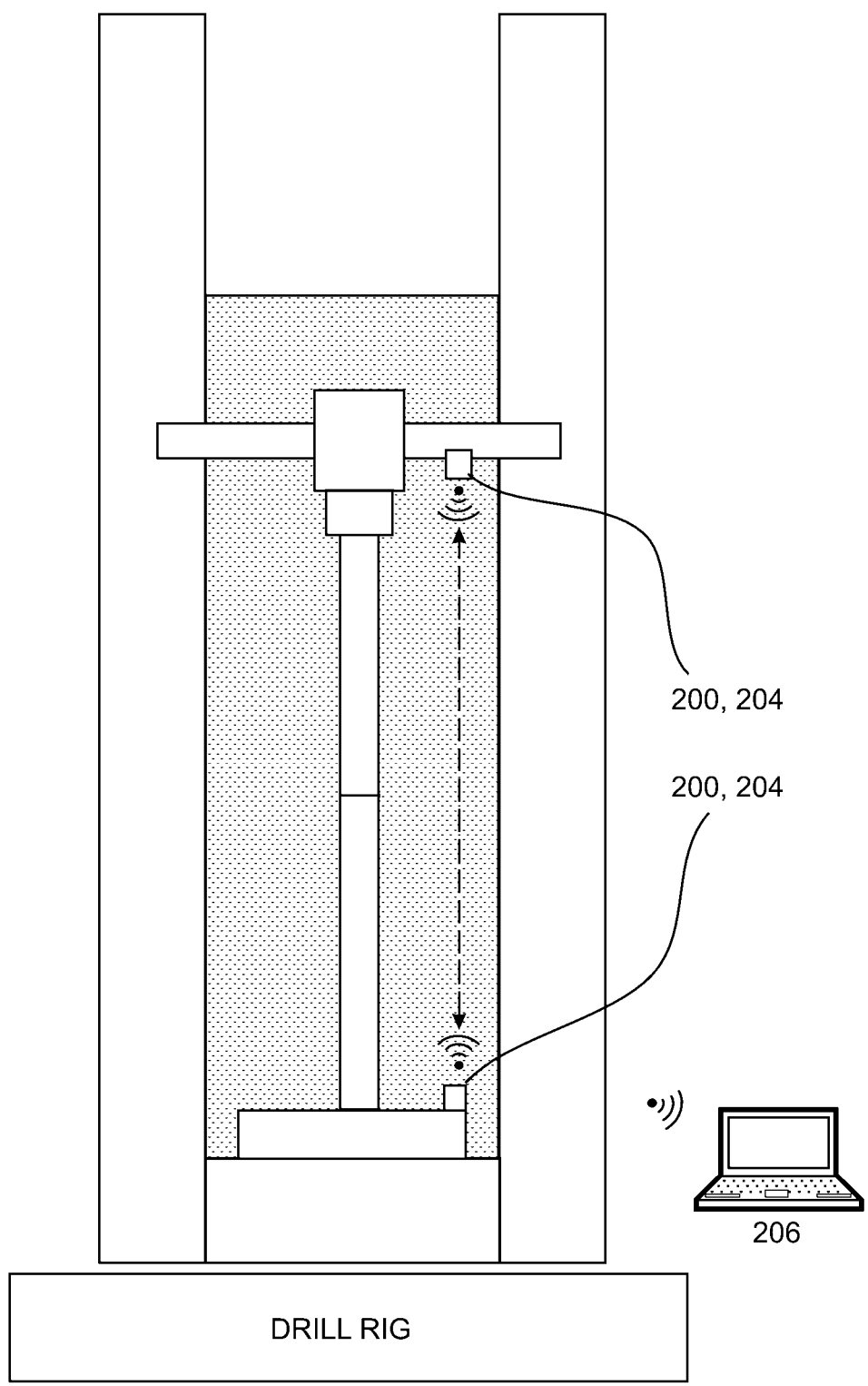
FIG. 9 shows and EM sender/transmitter sending a signal to detector at a fixed position of rig, and a sender/transmitter at a fixed position of the rig sends a signal to the receiver on the mast. Distance measurement can be processed for each receiver, and measured/processed data can be transmitted by each apparatus to a remote user interface/computer, according to an embodiment of the present invention.

FIG. 9 shows and EM sender/transmitter 200 sending a signal to detector 204 at a fixed position of rig, and a sender/transmitter 200 at a fixed position of the rig sends a signal to the receiver 204 on the mast. Distance measurement can be processed for each receiver, and measured/processed data can be transmitted by each apparatus to a remote user interface/computer 206, according to an embodiment of the present invention.

Figure 10:
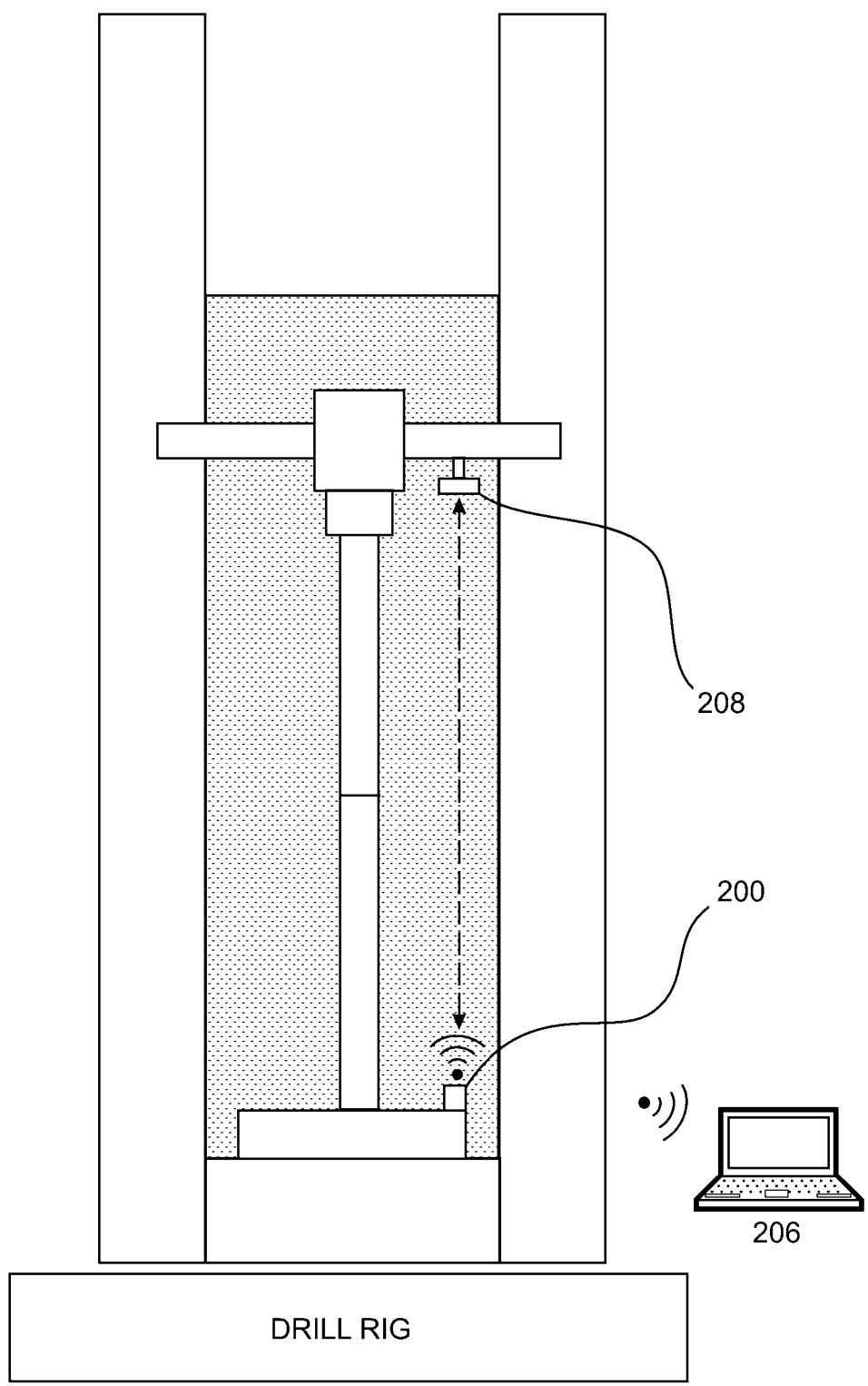
FIG. 10 shows an EM sender/transmitter sending a signal from a fixed position of rig to reflector on the mast of the drill rig, then the sensor receives the reflected signal, processes data and sends to the remote user interface/computer, according to an embodiment of the present invention.

FIG. 10 shows an EM sender/transmitter sending a signal from a fixed position of rig to reflector on the mast of the drill rig, then the sensor receives the reflected signal, processes data and sends to the remote user interface/computer 206, according to an embodiment of the present invention.

LIDAR can be used to obtain depth information. Embodiments of the present invention can employ one or more Augmented Reality (AR) and/or Artificial Intelligence (AI) algorithms/processes to determine specific measurement between points on the drill rig. For example, recognising a feature of the drill rig as a reference point, and camera and the LIDAR focus on that recognised reference as a datum.

Sensing can utilise MEMS mirror technology, such as using at least one laser to reflect off a MEMS mirror to determine spatial distance and/or determine space details/measurements. MEMS mirror technology can use a single mirror and multiple lasers, or multiple mirrors with a single laser or multiple lasers.

Use of LIDAR scanning as part of the sensor arrangement or apparatus of embodiment of the present invention enable use of image depth information about the scanned/viewed environment, such as the drill rig. Image depth information can be used by embodiments of the present invention for distance measurement, such as spacing between features on the drill rig, identifying a reference/datum point and movement relative to that reference datum point.

Combining three dimensional mesh data and depth information enables placement of virtual objects within viewed/sensed environment, such as on the drill rig. Such functionality allows for enhanced measurement data and allows for location and position information to be attributed to an image.

Microelectromechanical mirror systems (MEMS) or microoptoelectromechanical systems (MOEMS), such as using mirror/micro-scanning mirror devices and/or light engines may be employed in one or more embodiments of the present invention to create 3D optical spatial maps, such as of the drill rig or parts thereof.

Microelectromechanical mirrors (MEMS) systems can include a laser directed to a rapidly spinning (e.g. tilt-turn) mirror reoriented to view a space. A second dimension can use a second mirror that moves up and down or another laser can illuminate the first mirror but from a different angle from the first laser. Shock/vibration resilience can be provided to dampen vibrations that might otherwise put the MEMS system out of calibration.

Mirrors, photodetectors, silicon optical bench technology e.g. wafer level optical integration technology may be employed.

For example, a MEMS scanner module for 3D distance measurement using a laser/LIDAR sender/transmitter can be employed on the drill rig, such as with a single sending mirror, and a synchronized microscanner array as receiver unit.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A drilling rate of penetration or distance moved measurement system for a drilling operation, the system comprising:
   at least one sensor apparatus mounted on a drill rig, wherein the at least one sensor apparatus includes a first sensor and a second sensor, wherein the first sensor is a first barometric pressure sensor mounted on a mast or a drill string to move vertically with progression of a drill bit and is configured to detect a change in surrounding air pressure with advancing or withdrawing movement of the drill bit, and the second sensor is a second barometric pressure sensor mounted at a fixed position on the drill rig to provide a reference pressure measurement; and at least one processor in data communication with the at least one sensor apparatus, wherein the at least one processor calculates an incremental distance of progression of the drill bit based on difference between barometric pressure measured by the first barometric pressure sensor and the second barometric pressure sensor.

2. The system of claim 1, wherein the first barometric pressure sensor is releasably mounted via a releasable mounting to the mast or the drill string, and wherein the releasable mounting is any one or more of:
   by magnetic attachment through at least one magnet provided on the respective first barometric pressure sensor,
   tie strap(s),
   adhesive, or
   mechanical fastener(s).

3. The system of claim 1, wherein any one or more of the first barometric pressure sensor and the second barometric pressure sensor includes any one or more of:
   a memory for storing pressure values and/or altitude values, and
   a transmitter configured to transmit measured pressure values and/or altitude values to the other of the first and second barometric pressure sensors.

4. The system of claim 1, wherein the first barometric pressure sensor and the second barometric pressure sensor, in use, synchronise with one another.

5. The system of claim 1, wherein the at least one said sensor apparatus is enabled to calibrate to a value provided from another said-sensor apparatus or from a reference apparatus.

6. The system of claim 1, further comprising one or more sensors that detect or measure any one or more of acceleration, inertia, gyroscopic values, force, torque, pressure, vibration, temperature, and mud flow, wherein the at least one sensor apparatus is configured to interface with the one or more sensors, and at least one threshold detector, wherein the at least one threshold detector provides an alert when optimisation parameters have dropped below a preferred state.

7. The system of claim 6, including display means and recording means, or communication means to communicate measurements for remote display and recordal.

8. A method of controlling drilling performance of a drilling system, the method including determining rate of penetration (ROP) of a drill bit during drilling, wherein determining ROP is based on sensing barometric pressure using a first barometric pressure sensor that is arranged to
   move with a drill string while advancing or withdrawing movement of the drill bit, and sensing a reference barometric pressure at a fixed point at a drill rig, and using a second barometric pressure sensor arranged to provide the reference barometric pressure, and wherein the first barometric pressure sensor transmits change in pressure or absolute values thereof to the second barometric pressure sensor and incremental distance travelled is based on difference between the barometric pressure measured by the first barometric pressure sensor and the second barometric pressure sensor during an elapsed time.

* * * * *

UNITED STATES PATENT AND TRADEMARK OFFICE
CERTIFICATE OF CORRECTION

PATENT NO. : 12,460,530 B2
APPLICATION NO. : 17/923229
DATED : November 4, 2025
INVENTOR(S) : Gordon Stewart Page 1 of 1

It is certified that error appears in the above-identified patent and that said Letters Patent is hereby corrected as shown below:

In the Claims

Claim 5, Column 17, Line 29, delete "said"

Claim 5, Column 17, Line 31, delete "said-"

Signed and Sealed this
Twenty-third Day of December, 2025

John A. Squires
*Director of the United States Patent and Trademark Office*